United States Patent Office 2,793,680
Patented May 28, 1957

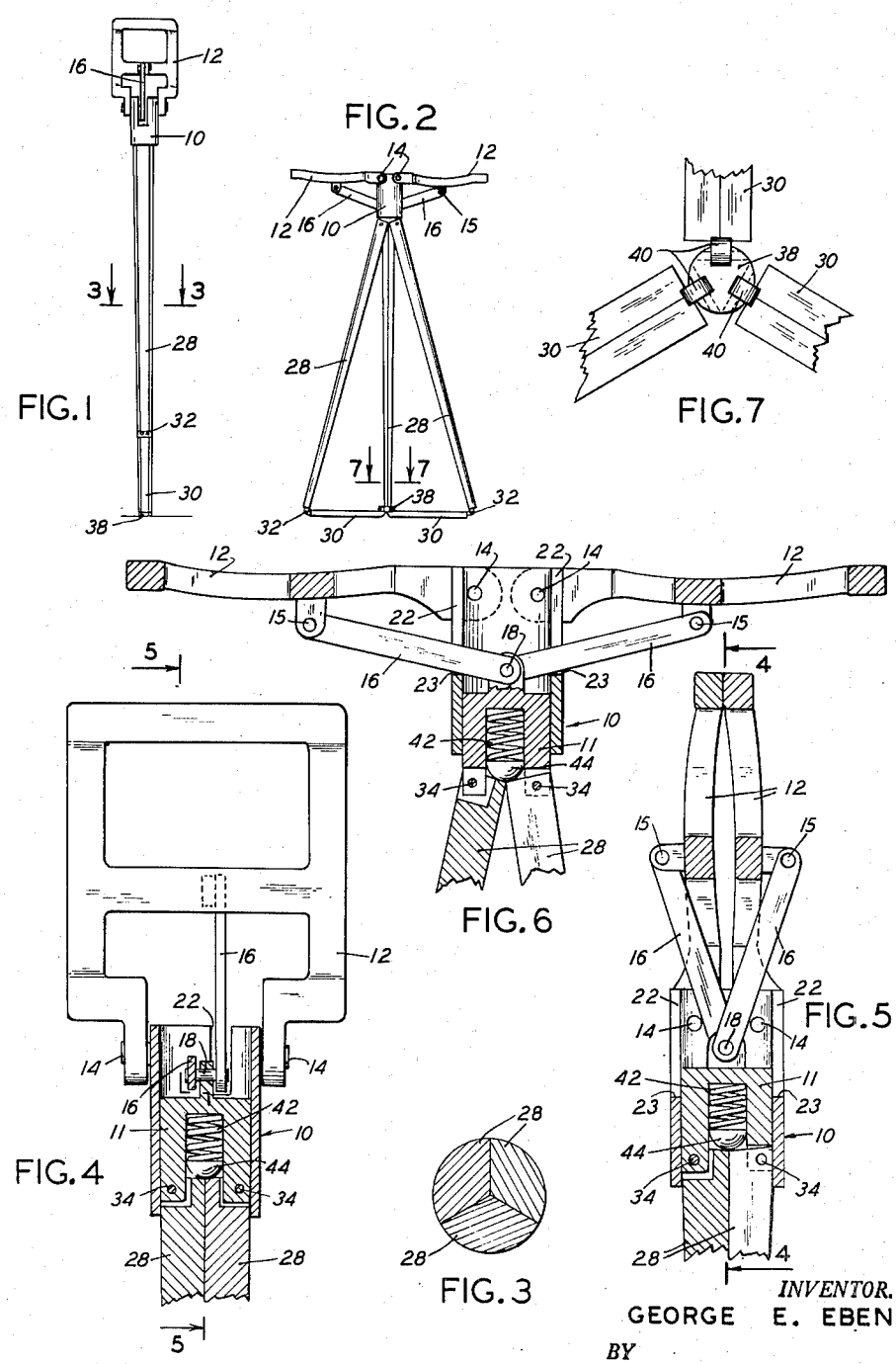

---

2,793,680
COMBINED FOLDING SEAT AND CANE

George E. Eben, San Francisco, Calif.

Application October 24, 1955, Serial No. 542,451

3 Claims. (Cl. 155—135)

The present invention relates to a combined cane and seat, and it is the general object of the invention to provide such a device which may be converted from a cane of convenient height to a spectator seat, also of convenient height.

Other specific objects and advantages will become more apparent in the following detailed description of the invention.

In brief, the device of the present invention comprises three nesting legs, each of which is formed of a pair of hinged links which, in the cane forming condition of the device, are held in an aligned position to form an elongate cane shaft. The legs are connected at their upper ends to a pair of leaves which form an extension of the legs and a cane handle, or, alternatively, may be spread to form a seat. The legs may be spread apart with the lower links of the legs forming a flat spider to provide a stable, ground engaging base for a seat of convenient height.

Further description of the invention will be made with particular reference to the accompanying drawings, wherein:

Fig. 1 is an elevational view of the device of the invention arranged as a cane;

Fig. 2 is an elevational view of the device arranged as a seat;

Fig. 3 is an enlarged sectional view taken substantially along line 3—3 of Fig. 1, showing the nesting arrangement of the legs of the device when used as a cane;

Fig. 4 is an enlarged, fragmentary medial section of the upper portion of the device, taken substantially along line 4—4 of Fig. 5;

Fig. 5 is an enlarged, sectional view of the upper portion of the cane taken substantially along line 5—5 of Fig. 4, showing the arrangement of the parts when the device is used as a cane;

Fig. 6 is a view similar to Fig. 5 but showing the arrangement of the device when it is used as a seat; and Fig. 7 is an enlarged, fragmentary view, looking at the device in the general direction of line 7—7 of Fig. 2.

The combined cane and seat of the invention comprises a body portion including a relatively short, tubular member 10 in which a plunger 11 is disposed. A pair of seat-handle elements 12 are hingedly mounted on the upper end of the tubular member 10 by means of pins 14 for movement of the elements between an upwardly extending, cane handle forming position, such as shown in Figs. 1, 4 and 5, and a horizontally extending, seat forming position, as shown in Figs. 2 and 6. Pivotally secured at 15 to the lower surface of each of the elements 12 is one end of a link 16, the opposite ends of the links being connected by a common pivot pin 18 to the plunger 11. The tubular member 10 is provided with slots 22 to accommodate movement of the links 16 when the seat-handle elements 12 are moved from a vertical position as shown in Fig. 5 to a horizontal position as shown in Fig. 6. The depth of the slots 22 is such that the links 16 engage the bottom thereof (Fig. 6) to support the seat-handle elements in seat forming position. It will be noted that when the seat-handle elements 12 are moved to the raised position, the plunger 11 is moved upwardly relative to the tubular member 10 and within the latter, whereas the plunger is moved downwardly and projected slightly outwardly of the lower end of the tubular member 10 when the seat-handle elements are lowered to the seat forming position.

Hingedly connected to the lower end of the plunger 11 are three cane and seat forming legs, each including an upper link or part 28 and a lower link or part 30 suitably hinged together by a hinge connection indicated at 32, the upper part 28 of the leg being connected to the plunger 11 by a hinge pin 34. The legs are of generally triangular cross section and shaped so as to nest together snugly, as shown in Fig. 3, in the cane forming position of the legs. The upper leg parts are further shaped so as to nest snugly within the lower part of the tubular member 10 in the cane forming position of the device, as shown best in Figs. 4 and 5.

The lower leg parts are hingedly connected to each other at their lower ends by means of a small, disk-like connecting element 38, the hinge connection between the connecting element and the lower part 30 of the legs being indicated at 40.

When the seat-handle elements 12 are folded outwardly into a horizontal plane, the links 16 force the plunger 11 downwardly, partially ejecting it from the tubular member 10 to permit the legs to be spread apart into a tripod support. To assist in spreading the legs, spring means are provided, including a coil spring 42 mounted in a recess in the plunger 11 and pressing against a ball 44 which acts on the inner corners of the legs to urge the same into a spread condition, as best indicated in Fig. 6. Since the lower leg parts are held together by the connecting element 38, when the upper leg parts 28 are spread apart, the legs break at the hinge connection 32 so that the lower leg parts 30 form a ground engaging spider, while the upper leg parts form a vertical seat support. The spider will automatically adjust itself to irregularities in the supporting surface so as to provide a stable seat.

Preferably, the seat-handle elements 12 are each about five inches long and the lower leg parts 30 are of about the same length, with the upper leg parts 28 and tubular member 10 about 22 inches in combined length. Thus, in the cane forming position of the device, the overall length would be about 32 inches, a convenient length for a cane. On the other hand, as a seat the device will have a height of about 22 inches, which is a convenient height for a seat.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A combined cane and seat comprising a hollow body member having lower and upper ends, a pair of seat-handle elements having hand holes hingedly mounted on the upper end of said body member for movement between an upwardly extending, cane forming position and a horizontally extending, seat forming position, a plunger disposed in said body member, link means connecting said seat-handle elements to said plunger for raising of said plunger upon raising of said seat-handle elements and for lowering and partially ejecting said plunger from said body member when said seat-handle elements are lowered, a plurality of at least three equi-angularly spaced legs hingedly connected to the lower end of said plunger with the upper end portions thereof fitting snugly within said body member when said plunger is retracted whereby said legs are held together, said legs each comprising an upper part and a lower part hingedly connected to said upper part, and means hingedly connecting together the lower ends of said lower leg parts, whereby upon ejection of said plunger from said body member, said upper leg parts may be pivoted outwardly to a tripod forming position and said lower leg parts pivoted to form a horizontal spider adapted to engage the ground and support the seat.

2. In a combined cane and seat, a short tubular body member having lower and upper ends, a pair of seat-handle elements hingedly mounted on the upper end of said body member for movement between an upwardly extending, cane handle forming position and a horizontally extending, seat forming position, a plunger reciprocally mounted in said body member, link members connecting said seat-handle elements to said plunger for raising said plunger and retracting the same within said body portion as said seat-handle elements are moved to said cane forming position, and for lowering and partially ejecting said plunger from said body member when said seat-handle elements are lowered to said seat forming position, three equi-angularly spaced legs hingedly connected to the lower end of said plunger, said legs being shaped to nest together and to fit when nested snugly within said body member whereby when said seat-handle elements are moved to said cane forming position the upper end portions of said legs are drawn into said body member and are held together, and spring means operatively arranged between said plunger and said legs to urge the same outwardly to form a seat supporting tripod upon ejection of said plunger from said body member.

3. A combined cane and seat comprising a tubular body member having lower and upper ends, a pair of seat-handle elements hingedly mounted on the upper end of said body portion for movement between an upwardly extending, cane handle forming position and a horizontally extending, seat forming position, a plunger slidably mounted in said body member, links connecting said seat-handle elements to said plunger for raising said plunger and retracting the same within said body member as said elements are moved to said cane forming position, and for lowering and partially ejecting said plunger from said body member, when said elements are lowered to said seat forming position, three equi-angularly spaced legs hingedly connected at their upper ends to the lower end of said plunger, said legs being shaped to nest together and to fit when nested snugly within said body member whereby when said seat-handle elements are moved to said cane forming position the upper end portions of said legs are drawn into said body member and are held together, said legs each comprising an upper part and a lower part hingedly connected to said upper part, means hingedly connecting together the lower ends of said lower leg parts, and spring means operatively arranged between said plunger and said upper leg parts to urge the same apart upon ejection of said plunger from said body member whereby upon lowering of said seat-handle elements to seat forming position, said upper leg parts pivot outwardly to a tripod-like position and said lower leg parts form a horizontal spider adapted to engage the ground and support the seat and whereby upon raising of said seat-handle elements to said cane handle forming position, said lower leg parts are moved to an aligned position with said upper leg parts to provide a cane of convenient length.

References Cited in the file of this patent

UNITED STATES PATENTS

| | | |
|---|---|---|
| 389,810 | Hendrickson | Sept. 18, 1888 |
| 494,303 | Nixon | Mar. 28, 1893 |
| 1,282,105 | Mowry | Oct. 22, 1918 |
| 1,338,124 | Dale | Apr. 27, 1920 |
| 1,601,206 | Franz | Sept. 18, 1926 |

FOREIGN PATENTS

| | | |
|---|---|---|
| 779 | Great Britain | Jan. 15, 1891 |
| 9,079 | Great Britain | 1908 |
| 219,853 | Germany | Mar. 10, 1910 |
| 856,214 | France | Mar. 11, 1940 |